United States Patent [19]

Takino et al.

[11] Patent Number: 5,225,011
[45] Date of Patent: Jul. 6, 1993

[54] TIRE OF SUPERIOR CUT RESISTANCE

[75] Inventors: Hiroshi Takino; Yusho Fuchikami; Katsuji Kishida, all of Osaka; Keijiro Oda, Hyogo, all of Japan

[73] Assignee: Toyo Tire & Rubber Company Limited, Osaka, Japan

[21] Appl. No.: 823,470

[22] Filed: Jan. 23, 1992

Related U.S. Application Data

[63] Continuation-in-part of Ser. No. 692,794, Apr. 29, 1991, abandoned, which is a continuation of Ser. No. 518,308, Apr. 30, 1990, abandoned, which is a continuation of Ser. No. 873,944, Jun. 13, 1986, abandoned.

[30] Foreign Application Priority Data

Jun. 15, 1985 [JP] Japan .................. 60-130351
Jun. 15, 1985 [JP] Japan .................. 60-130352

[51] Int. Cl.[5] ............................................. B60C 11/00
[52] U.S. Cl. ................................................. 152/209 R
[58] Field of Search ............... 152/209 R, 209 D, 532, 152/549

[56] References Cited

U.S. PATENT DOCUMENTS

| | | | |
|---|---|---|---|
| 2,445,725 | 7/1948 | Walker | 152/209 R |
| 3,364,965 | 1/1968 | Oubridge | 152/209 R |
| 3,768,537 | 10/1973 | Hess et al. | 152/209 R |
| 3,873,489 | 3/1975 | Thurn et al. | 152/209 R |
| 4,154,277 | 5/1979 | Sato et al. | 152/209 R |
| 4,319,620 | 3/1983 | Knill | 152/209 R |
| 4,381,810 | 5/1983 | Cady et al. | 152/209 R |

*Primary Examiner*—Geoffrey L. Knable
*Attorney, Agent, or Firm*—Birch, Stewart, Kolasch & Birch

[57] ABSTRACT

A tire having superior cut resistance and less belt separation comprising a tread with steel cord belts in which a center rubber for middle part of the tread and a side rubber for both sides thereof are respectively formed of different rubber compositions, and in which at least an inner portion of the center rubber is composed of a rubber composition of superior cut resistance wherein either a natural rubber of a SBR blended natural rubber is compounded with carbon black of large iodine absorption number, silica and silane coupling agent expressed by a formula of $(OR)_3SiC_nH_{2n}SmC_nH_{2n}Si(OR)_3$ or $(OR)_3SiC_nH_{2n}X$, while the side rubber is composed of a rubber composition having small heat build up.

2 Claims, 3 Drawing Sheets

TIRE OF SUPERIOR CUT RESISTANCE

This application is a continuation-in-part of application Ser. No. 07/692,794, filed on Apr. 29, 1991, now abandoned, which is a continuation of application Ser. No. 07/518,308, filed on Apr. 30, 1990, now abandoned, which is a continuation of application Ser. No. 06/873,944, filed on Jun. 13, 1986, now abandoned.

BACKGROUND OF THE INVENTION

1. Field of the invention

The present invention relates to a radial tire with steel belt plies, and more particularly to a radial tire in which at least a portion of a tread rubber adjacent to the outside of the steel belt plies is composed of a center rubber for middle part of the tread and a side rubber disposed on both sides in the width direction of the tire, are formed of, i.e., two kinds of rubber compositions.

2. Description of the prior art

The tread of a radial tire is hard to deform since it is usually reinforced by providing the outside of a carcas ply comprising cords disposed radially with steel belt plies of high rigidity. Accordingly, when the tire is used on an unpaved road, the effect of dispersing stress by wrapping a trodden stone with a tread, i.e., a so-called envelope effect is relatively small, and the tire is easily cut. Particularly in the middle part of the tread, such envelope effect is small and at this part of the tread, the problem of cutting frequently occurs. When a large number of small cuts occur, the tread rubber is chipped and abrasion is accelerated. When such cuts reach a belt, moisture reaches the belt and causes the belt to rust, and finally causes a separation between the belt and the rubber. In the case of forming the tread portion into a two-layer construction comprising a cap and base and using a rubber of low heat build-up for a base rubber, in particular for the purpose of preventing the belt separation, since there is a reverse correlation between the low heat build-up of rubber and the cut resistance thereof as shown in FIG. 3, the cut resistance is not sufficiently obtained. Thus it is often the case that the belt separation occurs due to an invasion of moisture from the cut.

In view of the foregoing an attempt was proposed in Japanese laid-open Patent Publication (unexamined) No. 60-15203. According to this proposal, in a radial tire of two-layer construction comprising a cap and a base, a rubber of superior shock cut resistance is used for the middle portion of the crown of the base rubber, while a rubber of low heat build-up is used for a shoulder portion thereof, and wherein three different kinds of rubbers, each reinforced with carbon alone, are applied to cap rubber, base rubber middle portion and base rubber shoulder portion, respectively, to form a tread. However, even in the case of using different kinds of rubbers for the middle portion and the shoulder portion of the base rubber in the tread rubber of two-layer construction as proposed by this prior art, insofar as the tread is composed of the three different rubbers reinforced with carbon alone, it is difficult to improve the cut resistance while restraining the belt separation due to heat bus. Moreover, in the case of forming the tread rubber of plural kinds of rubbers, it is necessary to form it by extrusion molding. But it is quite difficult to arrange three kinds of rubbers at four places and to extrude them simultaneously for molding, from the view point of a manufacturing process.

SUMMARY OF THE INVENTION

Accordingly, an object of the present invention is to provide a novel radial tire with a tread construction in which heat build-up of a tread portion is small, belt separation is reduced, resistance of the tread to being cut is high and simultaneous extrusion molding of tread rubber is easily performed.

As a result of aggressive studies to solve the above-discussed problem of conventional radial tire, the inventors have found that a radial tire of superior cut resistance and less belt separation is obtained by producing a tread of a center rubber for the middle part of a crown and a side rubber, i.e., two kinds of rubbers, in such manner that at least the inner portion of the center rubber adjacent to outside of the steel belt plies is composed of a rubber composition of low heat build-up and superior cut resistance by compounding either a natural rubber or a natural rubber blended with styrene-butadiene copolymerized rubber with a reinforcing agent composed of carbon black, and silica with a silane coupling agent, and the side rubber is composed of a rubber of low heat build-up.

Namely, there is provided a radial tire, according to the present invention, with a belt comprising at least three steel belt plies, in which the tread rubber is composed of a center rubber arranged on the middle part of the tread in width direction of the tire occupying 20~90% of a tread width Wt and a side rubber arranged on both sides of the center rubber in the width direction of the tire, a heat build-up of the center rubber measured by Goodrich flexometer is 15~30° C. at least in the inner portion adjacent to outside of the steel belt plies, while a heat build-up of said side rubber is 14° to 25° C., and lower than that of the center rubber. The center rubber is a rubber composition containing 30 to 50 parts of carbon black with its iodine absorption number not less than 100 mg/g, 5 to 30 parts of silica, 0.5 to 6 parts of silane coupling agent and 0 to 3 parts of softener per 100 parts of raw material composed of 50 to 100% of natural rubber and 50% to 0% of styrene-butadiene rubber, said silane coupling agent being expressed by a formula

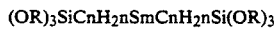

or

where:
R is alkyl group with its carbon number 1 to 4,
n is an integer number 1 to 6, m is an integer number 1 to 6, X is mercapto group, amino group or epoxy group.

DESCRIPTION OF THE PREFERRED EMBODIMENT

Referring now to the accompanying drawings, the present invention is described in detail hereinafter.

Figure 1:
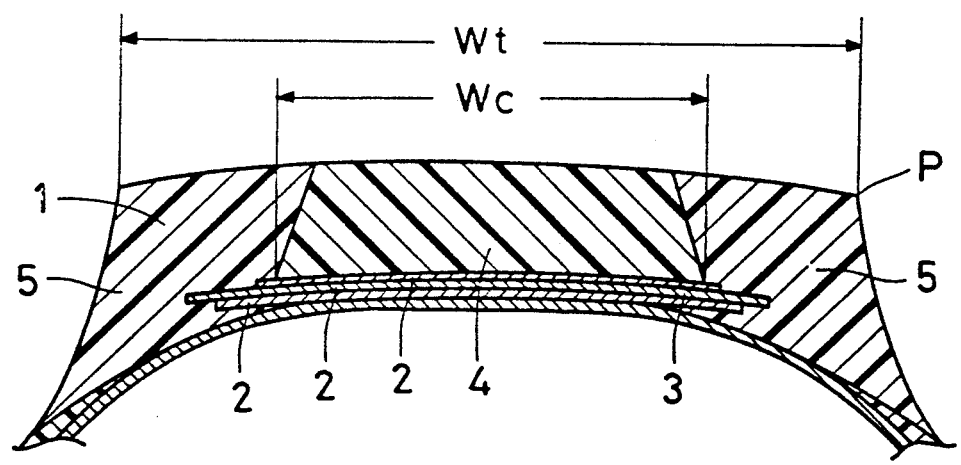
FIG. 1 is a sectional view of an example of a radial tire of superior cut resistance according to the present invention.

In the example of a radial tire shown in FIG. 1, a center rubber is formed of one and the same rubber composition in its entirety, and wherein a reference numeral (1) denotes a tread rubber composed of a center rubber (4) in which the middle part of a crown is disposed adjacent to the outside of belt (3), said tire comprising a plurality of steel belt plies and side rubbers (5) disposed adjacent to both sides of center rubber (4) in the width direction of the tire.

Since the tread rubber is thickest near an end P of a shoulder portion of the tread, if heat build-up of this thickened portion is high, the tread portion is heated during driving and fatigue is accelerated. Accordingly, it is preferable to use a rubber of low heat build-up for the side rubber, while using a rubber of superior cut resistance at least for the inner portion of the center rubber adjacent to the steel belt plies, even if it is not sufficient in view of low heat build-up.

The largest width Wc of the center rubber is established to occupy 20~90% of the width Wt of the tread. Because when the width Wc of the center rubber is less than 20% of the tread width Wt, an area of the belt covered with the center rubber of superior cut resistance in the middle part of the tread becomes too small, lowering the cut resistance, while more than 90%, the rubber of high heat build-up is located on the thickened portion of the tread rubber, causing the belt to easily separate.

Interface between the center rubber and the side rubber can be formed by expanding the width of the center rubber toward the tire surface as shown in FIG. 1, keeping the width constant or narrowing it toward the tire surface.

A rubber of which heat build up measured by Goodrich flexometer is 15~30° C. is used at least for the inner portion of the center rubber. When the heat build-up is over 30° C., the temperature of the most thickened portion of the tread is raised to a high temperature and belt separation easily occurs. On the other hand, when the heat build-up is less than 15° C., the cut resistance of the rubber is inferior. This is not preferable at least for the inner portion of the center rubber.

A rubber of which the heat build-up is lower than that of the center rubber, and is 14° to 25° C., preferably not higher than 20° C., is used for the side rubber. When the heat build-up of the side rubber is over 25° C., separation occurs easily at the belt end portion. When the heat build-up of the side rubber is less than 14° C., the cut resistance of the rubber is decreased. Since the tread rubber is thicker in the side portion than in the center portion and heat build-up and heat accumulation quantity during the driving is more in the side portion, it is necessary to use a rubber of lower heat build-up for the side rubber.

In another example of a radial tire of superior cut resistance according to the present invention, a center rubber of a tread is formed into two-layer construction, wherein the tread rubber (1) is composed of the center rubber (4) on the middle part of the crown and side rubber (5) on both sides thereof. The center rubber (4) formed into the two-layer construction is composed of an inner portion (6) disposed adjacent to outside of the belt (3) comprising a plurality of steel belt plies (2) and an outer portion (7) disposed outside of the inner portion (6) to cover it. The outer portion (7) is composed of a rubber of the same substance as the side rubber (5), and both portions are solidly formed.

Figure 2:
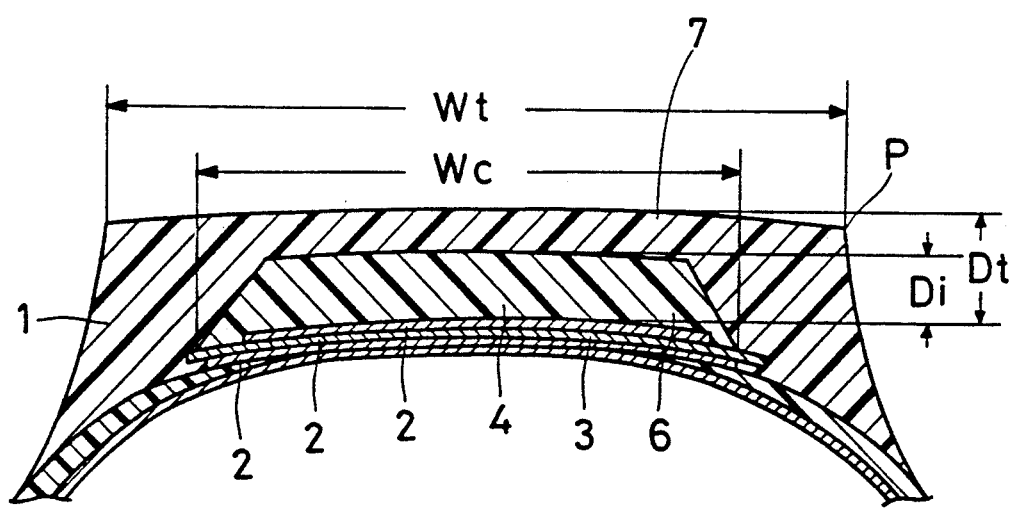
FIG. 2 is a sectional view of another example of the tire.
Figure 3:
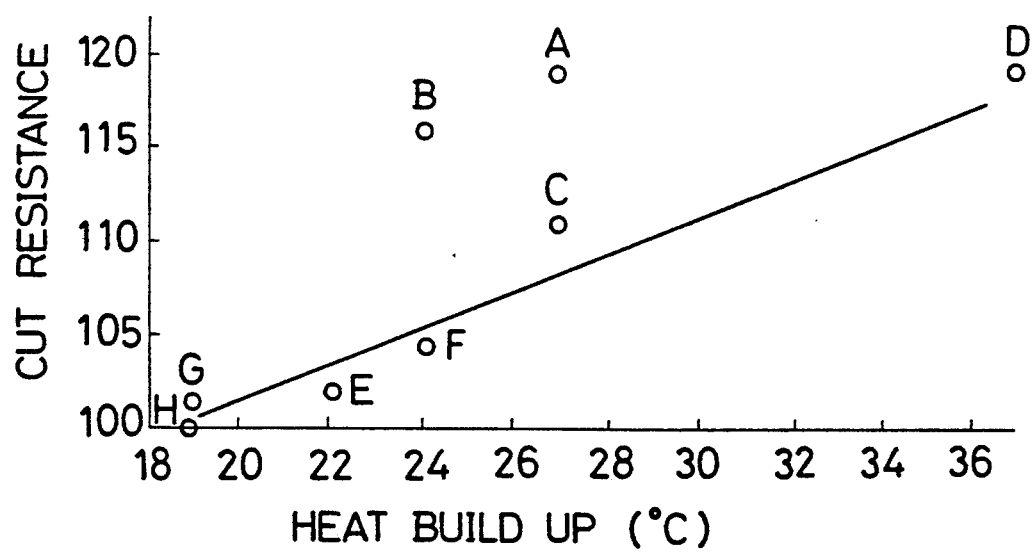
FIG. 3 is a graph showing the correlation between the heat build-up and the cut resistance of a rubber.

It is preferable for the width Wc of the inner portion (6) of the center rubber (4) to occupy 20~90% of the tread width Wt, shown in FIG. 2, while the thickness Di of the rubber for the inner portion is 15~80% of the tread thickness Dt, measured at the center of the tread width as shown in FIG. 2.

When the thickness Di of the inner portion is over 80% of the thickness Dt of the tread rubber, the outer portion is abraised in the earlier stage of use, resulting in the inner portion being finally exposed, and which results in a short life span for the tire. On the other hand, when the thickness Di is less than 15% of the thickness Dt, the effect of cut resistance is not sufficiently insured.

In the case of a construction shown in FIG. 2, the heat build-up of the rubber in the outer portion measured by a Goodrich flexometer is 14° to 25° C., and when the heat build-up of the outer portion, as measured by Goodrich flexometer, is over 25° C., separation occurs easily at the belt end, which is covered with the same stock as the outer portion. Therefore, a rubber composition conventionally used as a cap rubber of known tires of which heat build-up is lower than 25° C., is used for the side rubber and used for the inner portion. On the other hand, when the heat build-up of the rubber in the outer portion is less than 14° C., the cut resistance of the rubber is decreased. The heat build-up of the side rubber adjacent to the belt end is preferably lower than that of the inner portion of the center rubber.

In the radial tire according to the present invention, a rubber composition composed of 50~100% of natural rubber and 50~0% of styrene-butadiene copolymerized rubber compounded with carbon black, silica and silane coupling agent is used at least for the inner portion of the center rubber. If the natural rubber is less than 50% while the styrene-butadiene rubber is more than 50%, the heat build-up when driving is large to the extent which will cause belt separation.

Carbon black of which iodine absorption number IA is not less than 100 mg/g is used at least for the inner portion of the center rubber. When the iodine absorption number is less than this value, the cut resistance and the abrasion resistance of the rubber are not sufficient. 30 to 50 parts of the carbon black are blended with 100 parts of rubber component. When less than 30 parts are blended, the cut resistance and the abrasion resistance become insufficient, and when more than 50 parts are blended, workability of the rubber is inferior.

The cut resistance can be further improved by compounding with silica and silane coupling agent in addition to the carbon black due to synergism. 5 to 30 parts of silica is preferably blended with 100 parts of the rubber component. When less than 5 parts of the silica is blended, the cut resistance is not sufficiently improved, and when more than 30 parts of the silica is blended, the workability of the rubber is lowered.

The silane coupling agent used at least for the inner portion of the center rubber is expressed by the following formula:

$$(OR)_3SiC_nH_{2n}S_mC_nH_{2n}Si(OR)_3 \qquad (1)$$

or $(OR)_3SiC_nH_{2n}X$      (2)

where R, n, m and X are as described before.

Thus, for example, the following compounds are used:
$(OC_2H_5)_3SiCH_2SH$
$(OC_2H_5)_3SiCH_2SCH_2(OC_2H_5)_3$
$(OC_2H_5)_3SiCH_2S_2CH_2(OC_2H_5)_3$
$(OC_2H_5)_3SiCH_2S_3CH_2(OC_2H_5)_3$
$(OC_2H_5)_3SiCH_2S_4CH_2(OC_2H_5)_3$
$(OCH_3)_3SiCH_2SH$
$(OCH_3)_3SiCH_2S_4CH_2SI(OCH_3)_3$
$(OC_2H_5)_3SiC_3H_6S_3C_3H_6Si(OC_2H_5)_3$
$(OC_2H_5)_3SiC_3H_6S_4C_3H_6Si(OC_2H_5)_3$
$(OCH_3)_3SiC_3H_6SH$
$(OC_2H_5)_3SiC_3H_6NH_2$ 1-6 parts of the silane coupling agent is preferably blended with 100 parts of the rubber component. When less than 1 part of the agent is blended, the cut resistance is not sufficiently improved. When more than 6 parts of the agent is blended, the cost alone is increased without an increase in the effect of cut resistance.

A softener is further compounded at least into the inner portion of the center rubber when necessary. Process oil, pine tar, and synthetic plasticizer are used as the softener. 0 to 3 parts of the softener is compounded with 100 parts of rubber component, and when less than 3 parts of the softener is compounded, the cut resistance of the center rubber is lowered. When the carbon black and silica are compounded, which exceeds the quantity specified above, the workability of the rubber is lowered, and in order to solve such lowering in workability it becomes necessary to add more softener, which eventually lowers the cut resistance of the rubber.

In this manner, according to the radial tire of the present invention, a tread is composed of a center rubber for middle portion thereof and side rubbers on both sides being a different kind of rubber from the center rubber, and in which the center rubber used at least for the inner portion thereof is composed of a rubber of superior cut resistance and relatively low heat build-up comprising a natural rubber or a SBR blended natural rubber to which carbon black of large iodine absorption number, silica and silane coupling agent are admixed, while the side rubbers are composed of a rubber of less heat build-up. As a result, even when driving on a rough road, cuts reaching the steel belts of the tire are reduced, and the occurrence of belt separation is reduced due to the low heat build-up of the tread rubber, which eventually extends the life span of the tire. Furthermore, since the tread rubber is composed of only two kinds of rubbers, it is possible to mold the tread rubber in one stage by means of a dual extruder.

EXAMPLES 1-6 and Controls 1-5

Rubbers composed of A-G in Table 1 are used for center rubber and side rubber of a tread to manufacture tires of size 1000R20 as examples 1-6 and control 1-5. Drum test and actual driving test are carried out on them and length of cuts occurred thereby is measured. Table 2 shows results.

TABLE 1

|  | A | B | C | D | E | F | G | H Reference |
|---|---|---|---|---|---|---|---|---|
| Natural rubber | 90 | 80 | 60 | 50 | 80 | 80 | 90 | 100 |
| SBR # 1500 | 10 | 20 | 40 | 50 | 20 | 20 | 10 |  |
| Carbon A ($I_2$ absorption No.: 145 mg/g) | 30 |  |  |  |  |  |  |  |
| Carbon B ($I_2$ absorption No.: 123 mg/g) |  | 40 |  | 60 |  |  |  | 50 |
| Carbon C ($I_2$ absorption No.: 102 mg/g) |  |  | 50 |  | 60 | 25 |  |  |
| Carbon D ($I_2$ absorption No.: 82 mg/g) |  |  |  |  |  |  | 50 |  |
| Silica | 30 | 20 | 10 | 10 |  | 30 | 10 |  |
| Silane A* | 6 | 3 |  |  |  |  |  |  |
| Silane B** |  |  | 0.8 |  |  | 0.5 | 1 |  |
| Process oil | 3 | 2 | 1 | 15 | 3 | 5 | 3 | 3 |
| Zinc oxide | 3 | 3 | 3 | 3 | 3 | 3 | 3 | 3 |
| Stearic acid | 1 | 1 | 1 | 1 | 1 | 1 | 1 | 1 |
| Vulcanization accelerator CZ | 1 | 1 | 1 | 1 | 1 | 1 | 1 | 1 |
| Sulfur | 2 | 2 | 2 | 2 | 2 | 2 | 2 | 2 |
| Antioxidant 810NA | 1 | 1 | 1 | 1 | 1 | 1 | 1 | 1 |
| Mooney viscosity peak value | 162 | 144 | 103 | 64 | 141 | 137 | 153 | 201 |
| Heat build-up (°C.) | 27 | 24 | 27 | 37 | 22 | 24 | 19 | 19 |
| Cut resistance (index) | 119 | 116 | 111 | 95 | 102 | 104 | 101 | 100 |
| Abrasion test (index) | 94 | 96 | 97 | 78 | 100 | 80 | 75 | 100 |

*Silane A: bis-(3 triethoxisilylpropyl)tetrasulfide
**Silane B: γ-mercaptopropyltrimethoxisilane

TABLE 2

|  | Examples | | | | | | Controls | | | | |
|---|---|---|---|---|---|---|---|---|---|---|---|
|  | 1 | 2 | 3 | 4 | 5 | 6 | 1 | 2 | 3 | 4 | 5 |
| Tread construction | FIG. 1 | FIG. 1 | FIG. 1 | FIG. 2 | FIG. 2 | FIG. 2 | FIG. 1 | FIG. 1 | FIG. 1 | FIG. 1 | FIG. 2 |
| Center rubber composition |  |  |  |  |  |  |  |  |  |  |  |
| Outer portion | A | B | C | H | H | H | D | H | H | H | A |
| Inner portion | A | B | C | A | B | C | D | H | H | D | H |
| Side rubber composition | H | H | H | H | H | H | H | A | H | H | A |
| Center rubber width (Wc/Wt) (%) | 50 | 70 | 90 | 30 | 70 | 90 | 90 | 50 | — | 90 | 50 |
| Inner portion thickness (Di/Dt) (%) | — | — | — | 70 | 50 | 20 | — | — | — | 50 | 70 |
| Drum test (index) | 100 | 100 | 100 | 100 | 100 | 100 | 90 | 45 | 100 | 80 | 40 |
| Cut total length (index) | 35 | 50 | 60 | 40 | 55 | 60 | 120 | 90 | 100 | 120 | 95 |

In Table 1, mooney viscosity peak value is measured by an S rotor at 100° C. according to ASTM D 1646 about "Rubber-Viscosity and Vulcanization Characteristics", and is shown a maximum value read out in four minutes after starting a biscometer. Heat build-up was determined by measuring temperature rise on the sample surface after vibration for 25 minutes by means of a Goodrich flexometer according to method A of ASTM D623 about "Heat Generation and Flexing Fatigue in Compression", i.e., under the conditions of 1800 r.p.m. in revolution speed, 48 Lbs in load, 0.175 inch in stroke, 40° C. in room temperature.

As for the cut resistance, a cylinder of which one end is cone-shaped is dropped onto a rubber cube of which one side is 10 cm to measure a depth of cut occurred thereby, and inverse number of measured value is shown by index establishing a rubber of H composition as a reference 100.

As for the drum test in Table 2, the test is carried out for 24 hours under a load of 30,000 kg at a speed of 56.4 km/h after completing test stage of durability test specified in Federal Motive Vehicle Safety Standard, FMVSS 119, and samples successfully completing test program without break down after the test as 100, samples with break down on the way are shown by index which is the travel distance of the test.

As for the abrasion test, result obtained by measurement according to ASTM D2228 about "Abrasion Resistance (Pico Abrader)" are shown by index establishing a rubber of H composition as 100.

As for the total cut length, the test is carried out on the combination of tires of Examples 1-3 and the controls 1-3 mounted on a truck, which is actually driven on an unpaved road, and each tire is disassembled to separate the tread when groove depth reaches 2-4 mm. Each cut length on the tread surface is measured to get the total sum thereof, and establishing the tire of Control 3 as a reference 100, the total cut length is shown by the index.

EXAMPLES 7-9 and Controls 10-11

Rubbers composed of A and B in Table 1 or of I-L in Table 3 are used for center rubber and side rubber of a tread to manufacture tires denoted examples 7-9 and controls 10 and 11 in Table 4. Drum test and actual driving test are carried out on them and length of cuts occurred thereby is measured. Table 4 shows results obtained as described above in reference to Table 2.

TABLE 3

|  | I | J | K | L |
|---|---|---|---|---|
| Natural rubber | 100 | 80 | 100 | 60 |
| SBR #1500 |  | 20 | 20 | 40 |
| Carbon black A (I2 absorption No.: 145 mg/g) |  |  | 60 | 65 |
| Carbon black D (I2 absorption No.: 82 mg/g) | 60 | 40 |  |  |
| Process oil | 8 | 6 | 3 | 12 |
| Zinc oxide | 3 | 3 | 3 | 3 |
| Stearic acid | 1 | 2 | 1 | 2 |
| Vulcankzation acceleralor CZ | 1 | 1 | 1 | 1 |
| Sulfur | 2 | 2 | 2 | 2 |
| Antioxydant 810NA | 1 | 1 | 1 | 1 |
| Heat build-up (°C.) | 14 | 10 | 25 | 32 |
| Cut resistance (index) | 94 | 82 | 108 | 110 |
| Abrasion test (index) | 92 | 84 | 105 | 108 |

TABLE 4

|  | Examples ||| Controls ||
|---|---|---|---|---|---|
|  | 7 | 8 | 9 | 10 | 11 |
| Tread construction | FIG. 1 | FIG. 2 | FIG. 2 | FIG. 2 | FIG. 2 |
| Center rubber composition |  |  |  |  |  |
| Outer portion | I | A | J | K | L |
| Inner portion | I | I | B | B | A |
| Side rubber composition | A | A | J | K | L |
| Center rubberwidth (Wc/Wt) (%) | 50 | 60 | 90 | 60 | 60 |
| Inner portion thickness (Di/Dt) | — | 40 | 40 | 40 | 40 |
| Drum test (index) | 100 | 100 | 100 | 100 | 60 |
| Cut total length (index) | 35 | 50 | 60 | 120 | 30 |

What is claimed is:

1. A radial tire of superior cut resistance comprising a belt and a tread rubber, characterized in that, said belt comprising at least three steel belt plies, and said tread rubber is composed of a center rubber arranged on the middle part of the tread in the width direction of the tire, occupying 20% to 90% of the tread width Wt and a side rubber arranged on both sides of the center rubber in the width direction of the tire, said center rubber is formed into a two layer construction comprising an inner portion adjacent to outside of the steel belt plies and has an outer portion composed of the same rubber composition as the side rubber, and a thickness Di of said inner portion being 15% to 80% of a tread thickness Dt measured at the center of the tread width, the heat build-up of said inner portion of the center rubber measured by a Goodrich flexometer according to method A of ASTM D623 is 15° to 30° C., while the heat build-up of said side rubber is 14° to 25° C. and lower than that of the inner portion of the center rubber, and in which the inner portion of the center rubber comprises a rubber composition containing 30 to 50 parts of carbon black having an iodine absorption number of not less than 100 mg/g, 5 to 30 parts of silica, 0.5 to 6 parts of a silane coupling agent and 0 to 3 parts of a softener per 100 parts of raw rubber composed of 50% to 100% of natural rubber and 50 to 0% of styrene-butadiene rubber, said silane coupling agent being represented by the formula

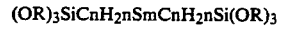

or

where:

R is an alkyl carbon of 1 to 4 atoms, n is an integer of 1 to 6, m is an integer of 1 to 6, X is mercapto, amino or epoxy.

2. The radial tire of superior cut resistance as claimed in claim 1 wherein the silane coupling agent is bis-(3 triethoxysilylpropyl)tetrasulfide.

* * * * *